(12) United States Patent
Krivtsov et al.

(10) Patent No.: US 7,597,011 B2
(45) Date of Patent: Oct. 6, 2009

(54) AUTOMOTIVE WEIGHT SENSOR FOR OCCUPANT CLASSIFICATION SYSTEM

(75) Inventors: Sergey Krivtsov, Kitchener (CA); Otman A. Basir, Waterloo (CA)

(73) Assignee: Intelligent Mechantronic Systems, Inc. (CA)

( * ) Notice: Subject to any disclaimer, the term of this patent is extended or adjusted under 35 U.S.C. 154(b) by 0 days.

(21) Appl. No.: 11/389,484

(22) Filed: Mar. 24, 2006

(65) Prior Publication Data

US 2006/0214483 A1  Sep. 28, 2006

Related U.S. Application Data

(60) Provisional application No. 60/664,751, filed on Mar. 24, 2005.

(51) Int. Cl.
*G01L 1/26* (2006.01)
(52) U.S. Cl. .................................. 73/862.391
(58) Field of Classification Search ............. 73/862.391
See application file for complete search history.

(56) References Cited

U.S. PATENT DOCUMENTS

| | | | | |
|---|---|---|---|---|
| 3,157,433 A * | 11/1964 | Davis | ..................... | 297/378.12 |
| 3,412,967 A * | 11/1968 | Swenson et. al. | ........... | 248/631 |
| 3,427,875 A * | 2/1969 | Saxl | ....................... | 73/862.045 |
| 4,098,357 A * | 7/1978 | Harder, Jr. | .................. | 248/575 |
| 4,629,151 A * | 12/1986 | Nishino | ....................... | 248/396 |
| 4,979,716 A * | 12/1990 | Holdampf | .................... | 248/393 |
| 5,765,840 A * | 6/1998 | Tame | .......................... | 297/330 |
| 5,765,915 A * | 6/1998 | Lee | ....................... | 297/344.12 |
| 6,109,691 A * | 8/2000 | Gray et al. | ............. | 297/216.17 |
| 6,407,347 B1 | 6/2002 | Blakesley | | |
| 6,595,570 B2 * | 7/2003 | Susko | ........................ | 296/68.1 |
| 6,913,237 B2 * | 7/2005 | Lin et al. | ..................... | 248/424 |
| 6,940,026 B2 * | 9/2005 | Rundell et al. | .............. | 177/144 |
| 6,950,031 B2 | 9/2005 | Selig et al. | | |
| 7,178,870 B2 * | 2/2007 | Wolfe et al. | .............. | 297/217.2 |
| 2004/0187609 A1 | 9/2004 | Nishio et al. | | |

OTHER PUBLICATIONS

PCT International Search Report, mailed Jul. 4, 2006.

* cited by examiner

*Primary Examiner*—Lisa M Caputo
*Assistant Examiner*—Octavia Davis
(74) *Attorney, Agent, or Firm*—Carlson Gaskey & Olds PC

(57) ABSTRACT

An occupant weight sensing system includes a loading rod, which replaces a seat height adjuster pivot bolt and extends away from a seat height adjuster link. A sensing element is mounted at the opposing end of the loading rod. When force is applied the loading rod acts as a cantilever to transfer radial force to the sensing element. A plurality of strain gages are arranged down the center of the sensing element to provide a measurement of strain on the sensing element. The loading rod flexes to transfer any excessive force to a seat bracket. The sensing element has a low sensitivity to axial forces to avoid requiring additional mechanical components to protect the sensing element.

11 Claims, 2 Drawing Sheets

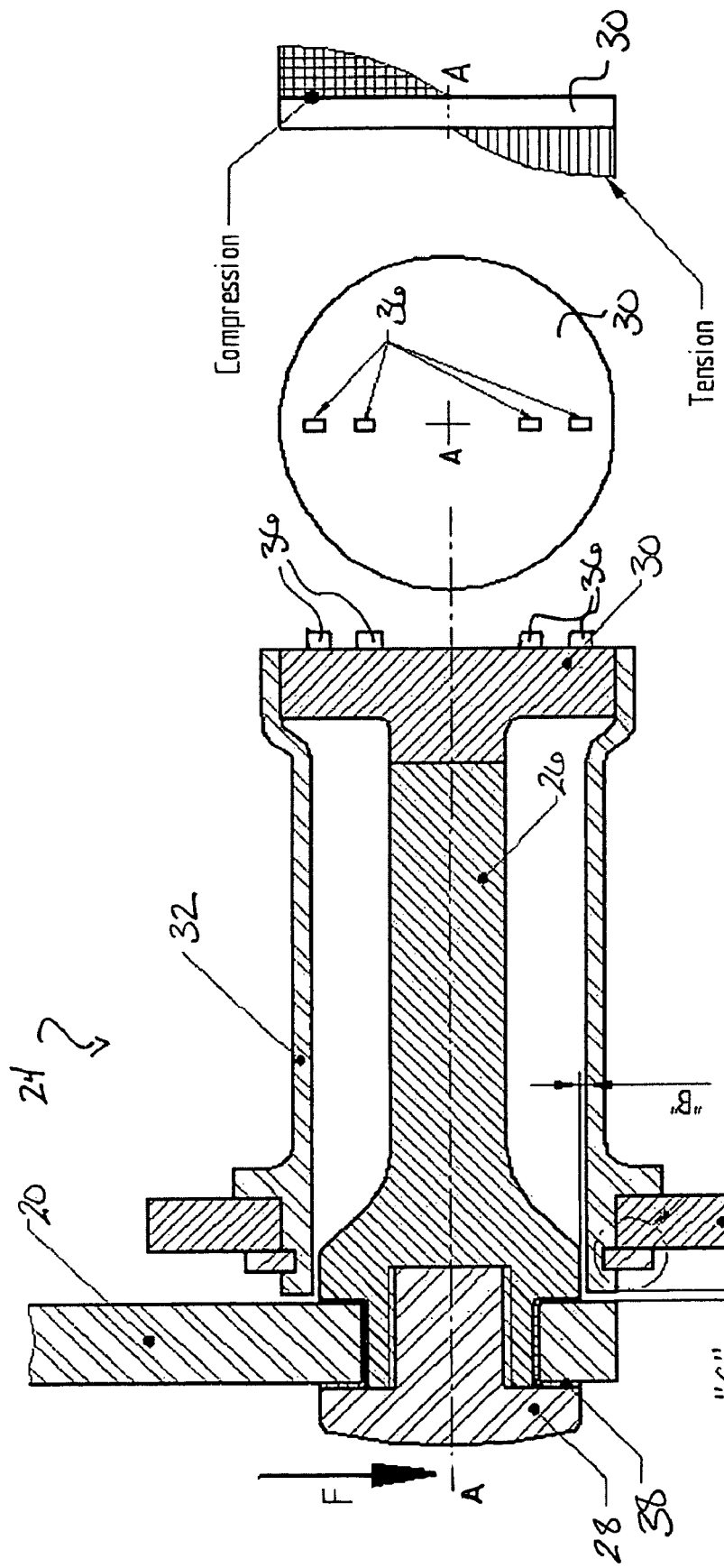
Figure 2
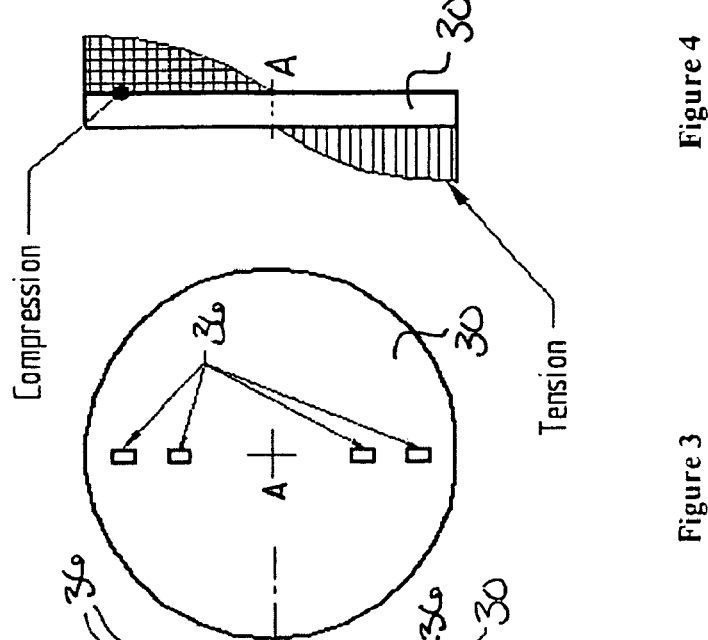
Figure 3
Figure 4

AUTOMOTIVE WEIGHT SENSOR FOR OCCUPANT CLASSIFICATION SYSTEM

REFERENCE TO RELATED APPLICATION

The present invention claims the benefit of U.S. Provisional Patent Application No. 60/664,751, filed Mar. 24, 2005.

BACKGROUND OF THE INVENTION

This invention generally relates to an occupant weight sensing system for a vehicle. More particularly, this invention relates to a simplified arrangement of sensing occupant weight using a strain gage.

Occupant weight sensing systems are commonly used to determine the size and position of a vehicle occupant. The vehicle occupant information is utilized in vehicle safety systems, including airbag deployment.

Once such sensing system, described U.S. Pat. No. 6,005,199, which describes a sensing system including a load cell having design features to lengthen the load path. The load path is lengthened from the loading point to the strain occurrence measurement area. Such an approach allows improvement of the strain profile in the measurement area to some extent. The sensing system also includes a spherical end pin to transmit force within the load path. However, the sensing system does not allow for decoupling of the strain occurrence measurement area.

It is therefore desirable to develop and design an improved arrangement for an occupant weight sensing system using a strain gage which allows for decoupling of the sensor element while limiting the additional hardware required.

SUMMARY OF THE INVENTION

An example occupant weight sensing system includes a sensor assembly incorporated into a seat height adjuster.

The occupant weight sensing system includes a sensor assembly and seat height adjustment link. When a vehicle seat is occupied downward force is applied on the adjustment link from the occupant. A loading rod replaces a height adjuster pivot bolt and extends away from the adjuster link. A sensing element is mounted at the opposing end of the loading rod. When force is applied the loading rod acts as a cantilever to transfer radial force to the sensing element. A plurality of strain gages are arranged down the center and bonded to the sensing element. The strain gages provide a bi-directional measurement of the strain of the sensing element from the force, and communicate the measured information to an attached vehicle system. The vehicle system uses the strain data to calculate the weight of the seat occupant.

The sensing element is firmly attached to a rigid housing and the loading rod is firmly attached to the sensing element creating a solid mechanical structure. The housing surrounds the loading rod, but is not connected to the loading rod. When excessive force is applied the loading rod flexes and eliminates the clearance between the housing and the loading rod to transfer the excessive force from the loading rod to a seat bracket through the housing.

Axial clearance between the loading rod and the adjustment link reduces the transfer of axial force from the adjustment link to the loading rod. Additionally, the sensing element has a high rigidity and low sensitivity to axial forces applied to the loading rod to avoid requiring additional mechanical components to protect the sensing element against axial forces.

These and other features of the present invention can be best understood from the following specification and drawings, the following of which is a brief description.

BRIEF DESCRIPTION OF THE DRAWINGS

FIG. 2 is cross-section of a portion of the occupant weight sensor of FIG. 1.

FIG. 3 is an end view of the example sensing element of FIG. 1.

FIG. 4 is a plot illustrating the distribution of strain on the example sensing element of FIG. 3.

DETAILED DESCRIPTION OF THE PREFERRED EMBODIMENT

Figure 1:
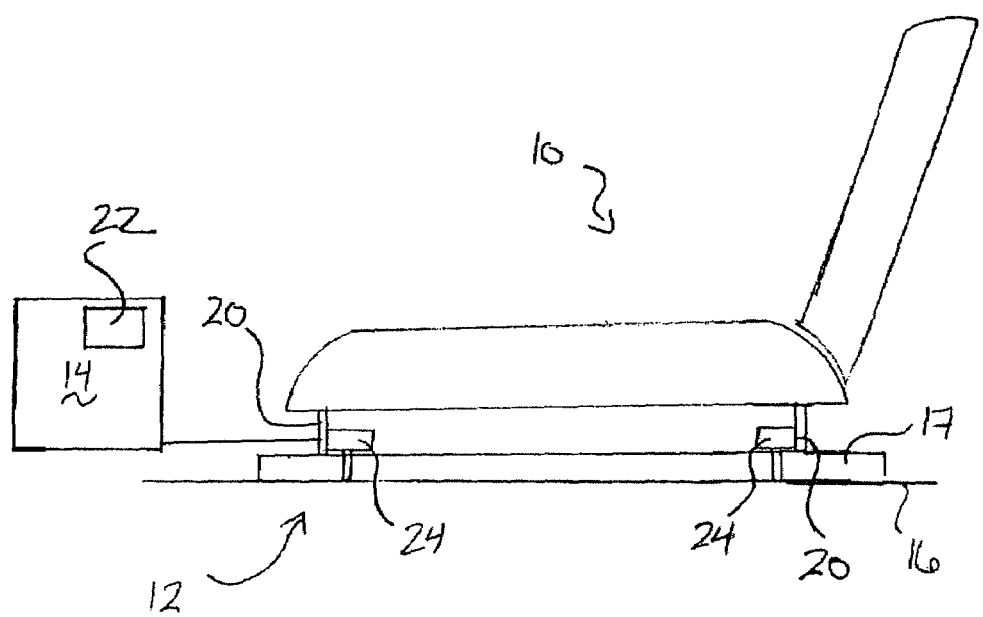
FIG. 1 is a illustration of a vehicle seat having an example occupant weight sensor according to the present invention.

FIG. 1 illustrates a vehicle seat 10 having an occupant weight sensing system 12. The occupant weight sensing system 12 may be connected to a vehicle safety system 14, such as an airbag deployment system. The vehicle seat 10 is mounted to the vehicle body 16 through seat rails 17. A seat adjuster allows the seat occupant to adjust the seat 10 to a desired position. The seat adjuster includes a seat height adjustment link 20 and adjuster pivot bolts. When the seat is occupied downward force is applied on the adjustment link 20 due to the weight of the occupant. The pivot bolt 22 has been replaced with a sensor assembly 24. By replacing the pivot bolt 22 with the sensor assembly 24 the originally designed elevation of the seat relative to the car floor is maintained.

FIG. 2 illustrates the seat adjuster 18 with the occupant sensing system 12 of the present invention. The sensor assembly 24 includes a loading rod 26 connected to the adjustment link 20 with a connecting device 28, such as a bolt. The loading rod 26 extends away from the adjuster link 20 along an axis A. A sensing element 30 is mounted at the opposing end of the loading rod 26 from the adjustment link 20. Alternatively, the sensing element 30 is incorporated as a single piece with the loading rod 26. The sensing element 30 is attached to a housing 32 which encloses the sensing element 30 and the loading rod 26. The housing 32 is preferably a rigid material and is attached to a side bracket 34 of the seat 10 at an end opposing the sensing element 30 and adjacent to the adjuster link 20. The housing 32 surrounds the loading rod 26, but is not connected to the loading rod 26. There is a clearance B between the loading rod 26 and the housing 32.

FIG. 2 illustrates an end view of the sensing element 30. A plurality of strain gages 36 are bonded to the sensing element 30. In the embodiment shown there are four strain gages. Two are located above the axis A of the loading rod 26 and two are located below the axis A of the loading rod 26. It should be appreciated that any number of stain gages 36 may be used. One skilled in the art would know the proper number of strain gages 36 required. The plurality of strain gages 36 are arranged down the center of the sensing element 30, bisecting the axis A of the loading rod 26. The strain gages 36 are connected to the safety system 14 or another device for analyzing the data. The safety system 14 includes a computer 22 which incorporates a full Wheatstone bridge, in which each side of the bridge experiences opposite polarity voltage shifts due to the arrangement of the strain gages 36.

When an occupant is in the seat 10 downward force F is applied to the adjuster link 20. As the weight on the seat 10 increases the downward force acting on the adjuster link 20 increases. The loading rod 26 acts as a cantilever and bends with respect to the rigid housing 32. The downward force F applies a radial force to the loading rod 26. The radial force transfers down the loading rod to the sensing element 30.

FIG. 3 illustrates a plot of the typical force on the sensing element 30 as measured by the strain gages 36. The portion of the sensing element below the axis A of the loading rod 26 is placed in tension due to the force of the adjuster link 20. The portion of the sensing element above the axis A of the loading rod 26 is placed in compression due to the force of the adjuster link 20. The amount of compression or tension increases as the weight on the seat increases. With this arrangement the sensing element 30 is only sensitive to the component of the force, which coincides with the centerline of the strain gages 36. Any axial force, or a horizontal component of radial force does not affect the sensor system 12 output. The strain gages 36 provide a bi-directional measurement of the strain and communicate the measured information to the computer 22. The computer 22 uses the compression and tension data to calculate the weight of the seat occupant.

As it is shown in FIG. 2, the sensing element 30 is firmly attached to the housing 32 and the loading rod 26 is firmly attached to the sensing element 30, thus creating a solid mechanical structure. The loading rod 26 is prevented from movement due to excessive force by the housing 32. When excessive force is applied the loading rod 26 flexes and eliminates the clearance B between the housing 32 and the loading rod 26. The excessive force is then transferred from the loading rod 26 to the seat bracket 34 through the housing 32.

A sliding bearing 38 is located between the loading rod 26 and the adjustment link 20 reduces any axial forces from acting upon the loading rod 26. The bearing 38 also reduces friction at the pivot point and eliminates post-assembly measurement errors, caused by tightening torque. Axial clearance C between the loading rod 26 and the adjustment link 20 reduces the transfer of axial force from the adjustment link 20 to the loading rod 26. Additionally, the length of the sensing element 30 along the axis A of the loading rod 26 is shorter then the length perpendicular to the axis A. The sensing element 30 has low rigidity and high sensitivity to radial forces applied to the loading rod 26 and a high rigidity and low sensitivity to axial forces applied to the loading rod 26. It creates a favorable condition to avoid having any additional mechanical components to protect the sensing element 30 against axial forces.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An occupant weight sensing system comprising:
   a seat having a seat height-adjuster link;
   a loading rod located within a housing and attached to the seat height-adjuster link adjacent a first axial end of the loading rod;
   a sensing element located between the loading rod and the housing adjacent a second axial end of the loading rod; and
   a plurality of strain gages mounted on the sensing element on an opposing face from the loading rod, the seat height-adjuster link transferring load through the loading rod, to the sensing element to the housing.

2. The occupant weight system of claim 1, wherein a sliding bearing is located between the loading rod and the seat height-adjuster link.

3. The occupant weight system of claim 1, wherein the plurality of strain gages are aligned along the center of the sensing element parallel to the seat height-adjuster link.

4. The occupant weight system of claim 1, wherein the housing is secured to a side plate of the seat to comprise a rigid link between the side plate and the sensing element.

5. The occupant weight system of claim 1, wherein a mounting bolt secures the loading rod to the height-adjuster link.

6. The occupant weight sensor of claim 1, wherein the loading rod and housing have an axial and a radial clearance relative to one another when in an unloaded condition.

7. The occupant weight sensor of claim 1, a safety system is connected to the strain gages to measure a bi-directional output signal from the strain gages.

8. The occupant weight sensor of claim 1, loading rod is a seat height-adjuster pivot bolt.

9. The occupant weight sensor of claim 1, wherein the sensing element is mounted to the loading rod such that the sensing element experiences tension and compression strains when radial force is applied to the loading rod.

10. The occupant weight sensor of claim 1, wherein the sensing element and the loading rod have rigidity to radial force applied to the loading rod greater than rigidity to axial force applied to the loading rod.

11. The occupant weight sensor of claim 1, wherein the loading rod comprises a cantilever to transmit radial force applied to the loading rod to the sensing element.

* * * * *

UNITED STATES PATENT AND TRADEMARK OFFICE
CERTIFICATE OF CORRECTION

PATENT NO. : 7,597,011 B2  
APPLICATION NO. : 11/389484  
DATED : October 6, 2009  
INVENTOR(S) : Sergey Krivtsov and Otman A. Basir Page 1 of 1

It is certified that error appears in the above-identified patent and that said Letters Patent is hereby corrected as shown below:

On the Title Page of the issued patent item 73, the Assignee should read as:

-- Intelligent Mechatronic Systems Inc. --

Signed and Sealed this

Sixteenth Day of March, 2010

David J. Kappos  
*Director of the United States Patent and Trademark Office*